(12) United States Patent
Pandev et al.

(10) Patent No.: US 12,543,540 B2
(45) Date of Patent: Feb. 3, 2026

(54) HIGH RESOLUTION PROFILE MEASUREMENT BASED ON A TRAINED PARAMETER CONDITIONED MEASUREMENT MODEL

(71) Applicant: KLA Corporation, Milpitas, CA (US)

(72) Inventors: Stilian Ivanov Pandev, Santa Clara, CA (US); Arvind Jayaraman, New Hudson, MI (US)

(73) Assignee: KLA Corporation, Milpitas, CA (US)

( * ) Notice: Subject to any disclaimer, the term of this patent is extended or adjusted under 35 U.S.C. 154(b) by 880 days.

(21) Appl. No.: 17/694,402

(22) Filed: Mar. 14, 2022

(65) Prior Publication Data

US 2022/0352041 A1 Nov. 3, 2022

Related U.S. Application Data

(60) Provisional application No. 63/181,966, filed on Apr. 30, 2021.

(51) Int. Cl.
*H01L 21/66* (2006.01)
*G05B 13/04* (2006.01)
(Continued)

(52) U.S. Cl.
CPC ............ *H01L 22/12* (2013.01); *G05B 13/042* (2013.01); *G06F 18/21322* (2023.01); *G06F 18/21326* (2023.01)

(58) Field of Classification Search
CPC .................... H01L 22/12; G06F 18/21322
See application file for complete search history.

(56) References Cited

U.S. PATENT DOCUMENTS 5,608,526 A 3/1997 Piwonka-Corle et al.
5,859,424 A 1/1999 Norton et al.
(Continued)

FOREIGN PATENT DOCUMENTS

CN 106062939 B * 1/2020 ........... G06V 10/772
JP 6751871 B2 9/2020
(Continued)

OTHER PUBLICATIONS

International Search Report mailed on Jul. 27, 2022, for PCT Application No. PCT/US2022/024508 filed on Apr. 13, 2022 by KLA Corporation, 4 pages.
(Continued)

*Primary Examiner* — Peter Bradford
(74) *Attorney, Agent, or Firm* — Spano Law Group

(57) ABSTRACT

Methods and systems for measurements of semiconductor structures based on a trained parameter conditioned measurement model are described herein. The shape of a measured structure is characterized by a geometric model parameterized by one or more conditioning parameters and one or more non-conditioning parameters. A trained parameter conditioned measurement model predicts a set of values of each non-conditioning parameter based on measurement data and a corresponding set of predetermined values for each conditioning parameter. In this manner, the trained parameter conditioned measurement model predicts the shape of a measured structure. Although a parameter conditioned measurement model is trained at discrete geometric points of a structure, the trained model predicts values of non-conditioning parameters for any corresponding conditioning parameter value. In some examples, training data is augmented by interpolation of conditioning parameters and corresponding non-conditioning parameters that lie between
(Continued)

discrete DOE points. This improves prediction accuracy of the trained model.

20 Claims, 9 Drawing Sheets

(51) Int. Cl.
*G06F 18/2132* (2023.01)
*G06K 9/62* (2022.01)

(56) References Cited

U.S. PATENT DOCUMENTS

| | | | |
|---|---|---|---|
| 6,023,338 | A | 2/2000 | Bareket |
| 6,429,943 | B1 | 8/2002 | Opsal et al. |
| 6,716,646 | B1 | 4/2004 | Wright et al. |
| 6,778,275 | B2 | 8/2004 | Bowes |
| 6,787,773 | B1 | 9/2004 | Lee |
| 6,992,764 | B1 | 1/2006 | Yang et al. |
| 7,242,477 | B2 | 7/2007 | Mieher et al. |
| 7,321,426 | B1 | 1/2008 | Poslavsky et al. |
| 7,406,153 | B2 | 7/2008 | Berman |
| 7,478,019 | B2 | 1/2009 | Zangooie et al. |
| 7,626,702 | B2 | 12/2009 | Ausschnitt et al. |
| 7,656,528 | B2 | 2/2010 | Abdulhalim et al. |
| 7,826,071 | B2 | 11/2010 | Shchegrov et al. |
| 7,842,933 | B2 | 11/2010 | Shur et al. |
| 7,873,585 | B2 | 1/2011 | Zikson |
| 7,929,667 | B1 | 4/2011 | Zhuang et al. |
| 7,933,026 | B2 | 4/2011 | Opsal et al. |
| 8,068,662 | B2 | 11/2011 | Zhang et al. |
| 8,138,498 | B2 | 3/2012 | Ghinovker |
| 9,291,554 | B2 | 3/2016 | Kuznetsov et al. |
| 9,826,614 | B1 | 11/2017 | Bakeman et al. |
| 9,885,962 | B2 | 2/2018 | Veldman et al. |
| 9,915,522 | B1 | 3/2018 | Jiang et al. |
| 10,013,518 | B2 | 7/2018 | Bakeman et al. |
| 10,101,670 | B2 | 10/2018 | Pandev et al. |
| 10,152,678 | B2 | 12/2018 | Pandev et al. |
| 10,324,050 | B2 | 6/2019 | Hench et al. |
| 10,352,695 | B2 | 7/2019 | Dziura et al. |
| 2003/0021465 | A1 | 1/2003 | Adel et al. |
| 2004/0017574 | A1* | 1/2004 | Vuong ............... G03F 7/70625 356/625 |
| 2007/0176128 | A1 | 8/2007 | Van Bilsen et al. |
| 2007/0221842 | A1 | 9/2007 | Morokuma et al. |
| 2009/0152463 | A1 | 6/2009 | Toyoda et al. |
| 2009/0248340 | A1* | 10/2009 | Tian ..................... G01B 11/24 702/82 |
| 2011/0266440 | A1 | 11/2011 | Boughorbel et al. |
| 2012/0292502 | A1 | 11/2012 | Langer et al. |
| 2013/0208279 | A1 | 8/2013 | Smith |
| 2013/0304424 | A1 | 11/2013 | Bakeman et al. |
| 2014/0019097 | A1 | 1/2014 | Bakeman et al. |
| 2014/0064445 | A1 | 3/2014 | Adler |
| 2014/0111791 | A1 | 4/2014 | Manassen et al. |
| 2014/0172394 | A1 | 6/2014 | Kuznetsov et al. |
| 2014/0222380 | A1 | 8/2014 | Kuznetsov et al. |
| 2014/0297211 | A1 | 10/2014 | Pandev et al. |
| 2015/0046121 | A1 | 2/2015 | Dziura et al. |
| 2015/0110249 | A1 | 4/2015 | Bakeman et al. |
| 2015/0117610 | A1 | 4/2015 | Veldman et al. |
| 2015/0204664 | A1 | 7/2015 | Bringoltz et al. |
| 2015/0285749 | A1 | 10/2015 | Moncton et al. |
| 2015/0300965 | A1 | 10/2015 | Sezginer et al. |
| 2016/0117847 | A1* | 4/2016 | Pandev ..................... G06T 7/33 348/87 |
| 2016/0202193 | A1 | 7/2016 | Hench et al. |
| 2016/0282105 | A1* | 9/2016 | Pandev ................. G01B 11/24 |
| 2016/0320319 | A1 | 11/2016 | Hench et al. |
| 2017/0167862 | A1 | 6/2017 | Dziura et al. |
| 2018/0106735 | A1 | 4/2018 | Gellineau et al. |
| 2018/0107928 | A1* | 4/2018 | Zhang .................... G06N 3/082 |
| 2018/0113084 | A1 | 4/2018 | Hench et al. |
| 2018/0211891 | A1 | 7/2018 | Veerasingam |
| 2018/0293721 | A1* | 10/2018 | Gupta .................... G06N 3/045 |
| 2018/0328868 | A1 | 11/2018 | Bykanov et al. |
| 2019/0017946 | A1 | 1/2019 | Wack et al. |
| 2019/0293578 | A1 | 9/2019 | Gellineau |
| 2020/0200525 | A1* | 6/2020 | Chouaib ............ G01B 11/0641 |
| 2020/0335406 | A1 | 10/2020 | Liman et al. |
| 2021/0063329 | A1* | 3/2021 | Kuznetsov ............. H01L 22/12 |
| 2023/0092729 | A1* | 3/2023 | Pandev ............. G01N 21/9501 702/167 |

FOREIGN PATENT DOCUMENTS

| | | | |
|---|---|---|---|
| KR | 10-2020-0139800 | | 12/2020 |
| TW | 202109023 A | | 3/2021 |
| TW | 202111319 A | | 3/2021 |
| TW | 202113924 A | | 4/2021 |
| WO | WO-2019195481 A1 * | 10/2019 | ............... G03F 1/36 |
| WO | 2021-037484 | | 3/2021 |
| WO | 2021037484 A1 | | 3/2021 |

OTHER PUBLICATIONS

Lemaillet, Germer, Kline et al., "Intercomparison between optical and x-ray scatterometry measurements of FinFET structures" by Proc. SPIE, v.8681, p. 86810Q (2013).
Kline et al., "X-ray scattering critical dimensional metrology using a compact x-ray source for next generation semiconductor devices," J. Micro/Nanolith. MEMS MOEMS 16(1), 014001 (Jan.-Mar. 2017).

* cited by examiner

HIGH RESOLUTION PROFILE MEASUREMENT BASED ON A TRAINED PARAMETER CONDITIONED MEASUREMENT MODEL

CROSS REFERENCE TO RELATED APPLICATION

The present application for patent claims priority under 35 U.S.C. § 119 from U.S. provisional patent application Ser. No. 63/181,966, entitled "High Resolution Measurement of Memory Structures," filed Apr. 30, 2021, the subject matter of which is incorporated herein by reference in its entirety.

TECHNICAL FIELD

The described embodiments relate to metrology systems and methods, and more particularly to methods and systems for improved measurement of semiconductor structures.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. Optical and X-ray based metrology techniques offer the potential for high throughput without the risk of sample destruction. A number of metrology based techniques including scatterometry, reflectometry, and ellipsometry implementations and associated analysis algorithms are commonly used to characterize critical dimensions, film thicknesses, composition, overlay and other parameters of nanoscale structures.

Many metrology techniques are indirect methods of measuring physical properties of a specimen under measurement. In most cases, the raw measurement signals cannot be used to directly determine the physical properties of the specimen. Instead, a measurement model is employed to estimate the values of one or more parameters of interest based on the raw measurement signals. For example, ellipsometry is an indirect method of measuring physical properties of the specimen under measurement. In general, a physics-based measurement model or a machine learning based measurement model is required to determine the physical properties of the specimen based on the raw measurement signals (e.g., $\alpha_{meas}$ and $\beta_{meas}$).

In some examples, a physics-based measurement model is created that attempts to predict the raw measurement signals (e.g., $\alpha_{meas}$ and $\beta_{meas}$) based on assumed values of one or more model parameters. As illustrated in equations (1) and (2), the measurement model includes parameters associated with the metrology tool itself, e.g., machine parameters ($P_{machine}$), and parameters associated with the specimen under measurement. When solving for parameters of interest, some specimen parameters are treated as fixed valued ($P_{spec-fixed}$) and other specimen parameters of interest are floated ($P_{spec-float}$), i.e., resolved based on the raw measurement signals.

$$\alpha_{model} = f(P_{machine}, P_{spec-fixed}, P_{spec-float}) \quad (1)$$

$$\beta_{model} = g(P_{machine}, P_{spec-fixed}, P_{spec-float}) \quad (2)$$

Machine parameters are parameters used to characterize the metrology tool (e.g., ellipsometer 101). Exemplary machine parameters include angle of incidence (AOI), analyzer angle ($A_0$), polarizer angle ($P_0$), illumination wavelength, numerical aperture (NA), compensator or waveplate (if present), etc. Specimen parameters are parameters used to characterize the specimen (e.g., material and geometric parameters characterizing the structure(s) under measurement). For a thin film specimen, exemplary specimen parameters include refractive index, dielectric function tensor, nominal layer thickness of all layers, layer sequence, etc. For a CD specimen, exemplary specimen parameters include geometric parameter values associated with different layers, refractive indices associated with different layers, etc. For measurement purposes, the machine parameters and many of the specimen parameters are treated as known, fixed valued parameters. However, the values of one or more of the specimen parameters are treated as unknown, floating parameters of interest.

In some examples, the values of the floating parameters of interest are resolved by an iterative process (e.g., regression) that produces the best fit between theoretical predictions and experimental data. The values of the unknown, floating parameters of interest are varied and the model output values (e.g., $\alpha_{model}$ and $\beta_{model}$) are calculated and compared to the raw measurement data in an iterative manner until a set of specimen parameter values are determined that results in a sufficiently close match between the model output values and the experimentally measured values (e.g., $\alpha_{meas}$ and $\beta_{meas}$). In some other examples, the floating parameters are resolved by a search through a library of pre-computed solutions to find the closest match.

Implementing a physics-based measurement model to predict values of one or more parameters characterizing a structure under measurement from measured signals (e.g., spectra, X-ray diffraction images, etc.) has a number of disadvantages. In practice, the development of a physics-based model is costly in terms of time, effort, and computational effort. In many cases, the compromises necessary to realize a computationally tractable physics based model have an undesirable impact on measurement accuracy. In addition, a physics based measurement model may lead to misleading results when multiple solutions exist, i.e., when the same set of measurement signals has more than one solution for the value of a parameter of interest. In these examples, the regression process employed when implementing a physics-based measurement model strives to find a single solution among multiple solutions, which results in a loss of measurement completeness.

In some other examples, a trained machine learning based measurement model is employed to directly estimate values of parameters of interest based on raw measurement data. In these examples, a machine learning based measurement model takes raw measurement signals as model input and generates values of the parameters of interest as model output.

A machine learning based measurement model must be trained to generate useful estimates of parameters of interest for a particular measurement application. Generally, model training is based on raw measurement signals collected from a specimen having known values of the parameters of interest (i.e., Design of Experiments (DOE) data).

A machine learning based measurement model is parameterized by a number of weight parameters. Typically, the machine learning based measurement model is trained by a regression process that minimizes total output error (e.g., ordinary least squares regression). The values of the weight parameters are iteratively adjusted to minimize the differences between the known, reference values of the parameters of interest and values of the parameters of interest estimated by the machine learning based measurement model based on the measured raw measurement signals.

The traditional approach of training a machine learning based measurement model to predict values of one or more parameters characterizing a structure under measurement from measured signals (e.g., spectra, X-ray diffraction images, etc.) has a number of disadvantages. In practice, the model training requires a large number of DOE measurement samples, which are often costly to generate. In addition, the stability of the model training is often compromised when multiple solutions exist, i.e., when the same set of measurement signals has more than one solution for the value of a parameter of interest. In these examples, the traditional approach to training a machine learning based measurement model strives to find a middle ground between multiple solutions, which results in a loss of measurement accuracy.

Future metrology applications present challenges for metrology due to increasingly small resolution requirements, multi-parameter correlation, increasingly complex geometric structures, and increasing use of opaque materials. Thus, methods and systems for improved measurement model training and parameter inference are desired.

SUMMARY

Methods and systems for measurements of semiconductor structures based on a trained parameter conditioned measurement model are described herein. The shape of a measured structure is characterized by a geometric model parameterized by one or more conditioning parameters and one or more non-conditioning parameters. A trained parameter conditioned measurement model predicts a set of values of each non-conditioning parameter based on measurement data and a corresponding set of predetermined values for each conditioning parameter. In this manner, the trained parameter conditioned measurement model predicts the shape of a measured structure.

A parameter conditioned measurement model is trained to predict the shape parameterization of a measured structure from DOE measurement data and a set of known, DOE values of both the conditioning and the non-conditioning parameters at a number of discrete locations of the structure. At each iteration of model training, the DOE measurement data and the DOE values of the conditioning parameters are provided as input, and the model is trained to predict the DOE values of the corresponding non-conditioning parameters.

Due to the continuous nature of the trained parameter conditioned measurement model, the trained model learns the shape of the measured structure at all values of the conditioning parameters within the range of DOE values of the conditioning parameters employed during training. Although a parameter conditioned measurement model is trained at discrete geometric points of a structure, e.g., discrete instances of conditioning and non-conditioning parameters, the trained model predicts values of non-conditioning parameters for any corresponding conditioning parameter value.

The number of training samples required to achieve a high resolution predictive model is relatively small compared to a measurement model trained without conditioning parameters. Thus, a high resolution shape predictive model is trained from relatively a low resolution set of shape references using model conditioning as described herein.

A parameter conditioned measurement model as described herein enables the trained model to reconstruct a two dimensional image or a three-dimensional image of a structure under measurement. In general, parameters of interest determined based on a trained parameter conditioned measurement model as described herein, include, but are not limited to: geometric parameters characterizing a measured structure, dispersion parameters characterizing a measured structure, process parameters characterizing a process employed to fabricate a measured structure, electrical properties of the measured structure, etc. Exemplary geometric parameters include critical dimensions (CD), overlay, etc. Exemplary process parameters include lithography focus, lithography dosage, etch time, etc.

In another aspect, training data is augmented by interpolation to determine values of non-conditioning parameters associated with selected values of conditioning parameters that lie between discrete DOE points. By augmenting the training data set with additional sets of conditioning and non-conditioning values, prediction accuracy of the trained model improves.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Figure 1:
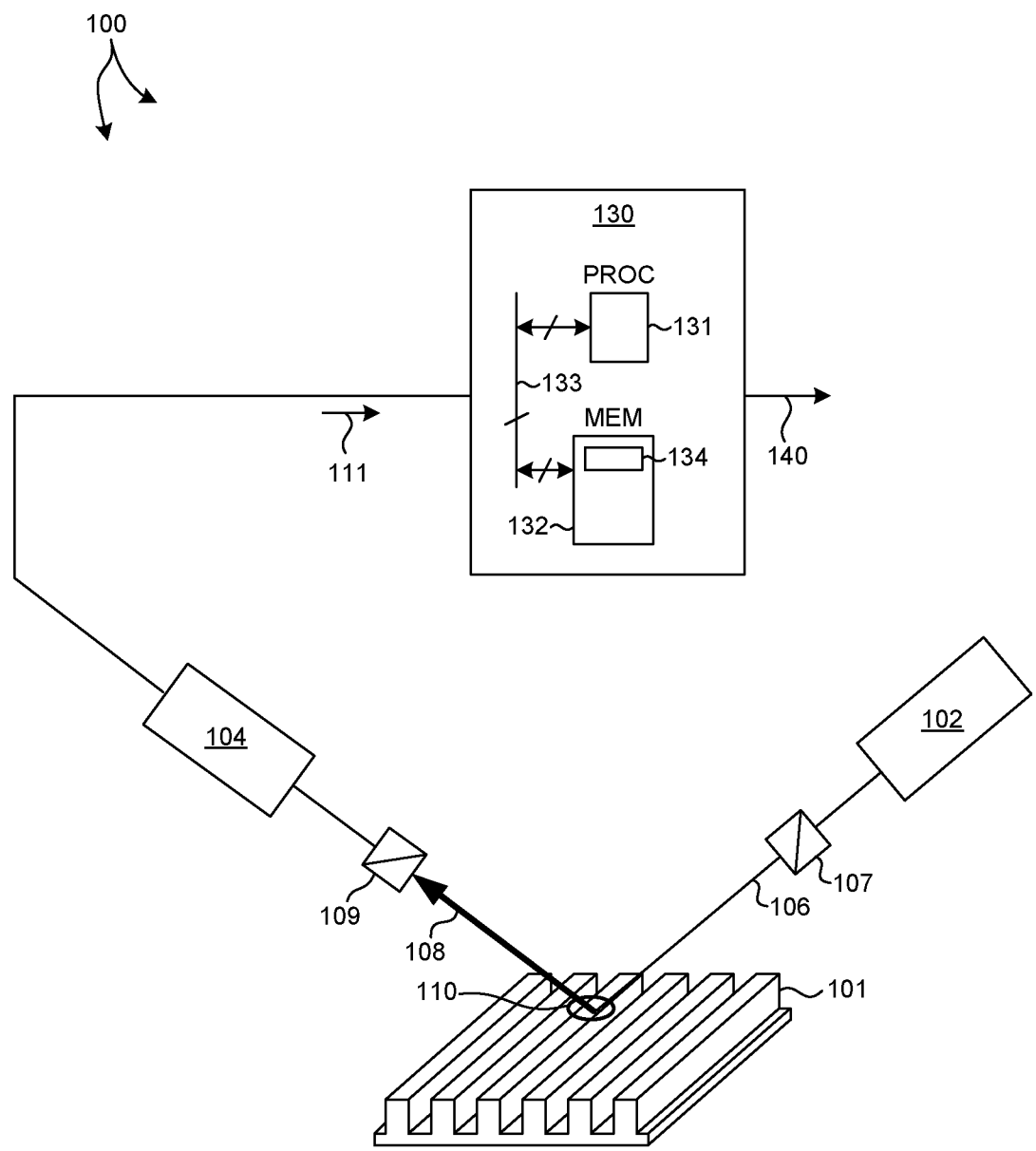
FIG. 1 depicts an illustration of a metrology system 100 for measuring characteristics of a semiconductor structure in accordance with the exemplary methods presented herein.

Reference will now be made in detail to background examples and some embodiments of the invention, examples of which are illustrated in the accompanying drawings.

Methods and systems for measurements of semiconductor structures based on a trained parameter conditioned measurement model are described herein.

The shape of a measured structure is characterized by a geometric model parameterized by multiple parameters. One, or more, of the parameters characterizing the shape of the measured structure is a conditioning parameter, and one, or more, of the parameters is a non-conditioning parameter. A trained parameter conditioned measurement model predicts a set of values of each non-conditioning parameter based on measurement data and a corresponding set of predetermined values for each conditioning parameter. In this manner, the trained parameter conditioned measurement model predicts the shape of a measured structure.

A parameter conditioned measurement model is trained to predict the shape parameterization of a measured structure from DOE measurement data and a set of known, DOE values of both conditioning and non-conditioning parameters at a number of discrete locations of the structure. At each iteration of model training, the DOE measurement data and the DOE values of the conditioning parameters are provided as input, and the model is trained to predict the DOE values of the corresponding non-conditioning parameters.

Due to the continuous nature of the trained parameter conditioned measurement model, the trained model learns the shape of the measured structure at all values of the conditioning parameters within the range of DOE values of the conditioning parameters employed during training. Hence, although a parameter conditioned measurement model is trained at discrete geometric points of a structure, e.g., discrete instances of conditioning and non-conditioning parameters, the trained model predicts values of non-conditioning parameters for any corresponding conditioning parameter value. This eliminates the inaccuracies induced by the interpolation required when predicting shape parameter values using an unconditioned measurement model. In addition, the trained model predicts arbitrary shapes without complex parameterized representations of the shape, e.g., Chebyshev coefficients, splines, etc.

The number of training samples required to achieve a high resolution predictive model is relatively small compared to a measurement model trained without conditioning parameters. Thus, a high resolution shape predictive model is trained from relatively a low resolution set of shape references using model conditioning as described herein.

In general, a parameter conditioned measurement model as described herein enables the trained model to reconstruct a two dimensional image or a three-dimensional image of a structure under measurement.

In general, parameters of interest determined based on a trained parameter conditioned measurement model as described herein, include, but are not limited to: geometric parameters characterizing a measured structure, dispersion parameters characterizing a measured structure, process parameters characterizing a process employed to fabricate a measured structure, electrical properties of the measured structure, etc. Exemplary geometric parameters include critical dimensions (CD), overlay, etc. Exemplary process parameters include lithography focus, lithography dosage, etch time, etc.

FIG. 1 illustrates a system 100 for measuring characteristics of a specimen in accordance with the exemplary methods presented herein. As shown in FIG. 1, the system 100 may be used to perform spectroscopic ellipsometry measurements of structure 101 depicted in FIG. 1. In this aspect, the system 100 may include a spectroscopic ellipsometer equipped with an illuminator 102 and a spectrometer 104. The illuminator 102 of the system 100 is configured to generate and direct illumination of a selected wavelength range (e.g., 100-2500 nm) to the structure disposed on the surface of the specimen over a measurement spot 110. In turn, the spectrometer 104 is configured to receive illumination reflected from structure 101. It is further noted that the light emerging from the illuminator 102 is polarized using a polarization state generator 107 to produce a polarized illumination beam 106. The radiation reflected by structure 101 is passed through a polarization state analyzer 109 and to the spectrometer 104. The radiation received by the spectrometer 104 in the collection beam 108 is analyzed with regard to polarization state, allowing for spectral analysis by the spectrometer of radiation passed by the analyzer. These spectra 111 are passed to the computing system 130 for analysis of the structure as described herein.

As depicted in FIG. 1, system 100 includes a single measurement technology (i.e., SE). However, in general, system 100 may include any number of different measurement technologies. By way of non-limiting example, system 100 may be configured as a spectroscopic ellipsometer (including Mueller matrix ellipsometry), a spectroscopic reflectometer, a spectroscopic scatterometer, an overlay scatterometer, an angular resolved beam profile reflectometer, a polarization resolved beam profile reflectometer, a beam profile reflectometer, a beam profile ellipsometer, any single or multiple wavelength ellipsometer, or any combination thereof. Furthermore, in general, measurement data collected by different measurement technologies and analyzed in accordance with the methods described herein may be collected from multiple tools, a single tool integrating one measurement technology, a single tool integrating multiple technologies, or a combination thereof, including, by way of non-limiting example, soft X-ray reflectometry, small angle x-ray scatterometry, an imaging based metrology system, a hyperspectral imaging based metrology system, a scatterometry overlay metrology system, etc.

In a further embodiment, system 100 may include one or more computing systems 130 employed to perform measurements of structures based on measurement models developed in accordance with the methods described herein. The one or more computing systems 130 may be communicatively coupled to the spectrometer 104. In one aspect, the one or more computing systems 130 are configured to receive measurement data 111 associated with measurements of a structure under measurement (e.g., structure 101).

In some embodiments, computing system 130 is configured to develop and train a parameter conditioned measurement model as well as execute the trained parameter conditioned measurement model to estimate values of one or more parameters of interest as described herein.

In one aspect, a geometric model of a structure under measurement, including both conditioning and non-conditioning parameters is determined. The geometric model characterizes the geometry of a structure in terms of both the conditioning and non-conditioning parameters of interest. In this manner, values of the conditioning and non-conditioning parameters of interest define the shape of a structure under measurement. In some embodiments, a geometric model defines the shape of a structure in two dimensions. In some other embodiments, a geometric model defines the shape of a structure in three dimensions.

In some examples, a geometric model is developed based on geometric primitives (e.g., trapezoids, etc.) and parameterized based on knowledge of the semiconductor processes employed to fabricate the structure.

In some examples, a geometric model is developed based on geometric primitives (e.g., trapezoids, etc.) and parameterized based on reference measurement data provided by a trusted reference metrology system. In one example, scanning electron microcopy (SEM) images are employed to directly measure the shape of a semiconductor structure and the measured shapes are employed to parameterize the geometric model.

In some examples, a geometric model is developed based on a family of reference shape profiles. In some examples, the reference shape profiles are determined from measurements of semiconductor structures fabricated in accordance with a DOE of process parameters.

In some examples, a geometric model is developed by simulation (e.g., a process simulation tool that predicts the shape of a structure fabricated in a accordance with a series of fabrication steps such as etch, lithography, etc.). In some of these examples, the geometric model includes a dataset of synthetically generated shape profiles based on a DOE of process parameters.

In some embodiments, a geometric model of a structure under measurement is characterized by a grid array of voxels spanning a three dimensional volume enveloping the measured structure. The size and spacing of the voxels of the array is known apriori. Each voxel of the voxel model is parameterized by a value of a property (e.g., transparency, electron density, etc.) associated with each voxel. In this manner the parameter values of the voxel model define a three dimensional image of the geometry of the structure under measurement. In typical semiconductor metrology applications, a voxel model of a measured structure includes a large number of voxels (e.g., one million or more voxels) to provide sufficient resolution to accurately estimate parameters of interest (e.g., critical dimensions, height, sidewall angle, etc.).

In another aspect, a DOE training dataset of measurement data, $S_j^{DPE}$, is generated based on a DOE set of geometric model parameter values including both conditioning and non-conditioning parameters, $\{CP^{DOE}, NCP^{DOE}\}_i$. In this example, the range of index, i, is 1:N, where N is any non-negative integer value. N is the number of discrete points where the shape of the structure is specified in the DOE dataset by the known values of both the conditioning and non-conditioning parameters. By way of non-limiting example, the known values are values measured by a trusted reference metrology system, assumed values, programmed values, etc. The range of index, j, is 1:M, where M is any non-negative integer value. M is the number of measurements collected from DOE structures characterized by the known values of both the conditioning and non-conditioning parameters at i discrete points.

In some embodiments, the DOE training dataset is actual measurement data collected from structures fabricated in accordance with the DOE set of geometric model parameter values including both conditioning and non-conditioning parameters, $\{CP^{DOE}, NCP^{DOE}\}_i$. In some embodiments, the values of the conditioning and non-conditioning parameters, $\{CP^{DOE}, NCP^{DOE}\}_i$ associated with each of the measured structures is measured by a trusted reference metrology system (e.g., SEM, TEM, etc.). In some embodiments, the values of the conditioning and non-conditioning parameters, $\{CP^{DOE}, NCP^{DOE}\}_i$ associated with each of the measured structures is a known, programmed value employed to fabricate the measured structures.

In some other embodiments, the DOE set of values of the conditioning and non-conditioning parameters, $\{CP^{DOE}, NCP^{DPE}\}_i$ are known, programmed parameter values, and the corresponding training dataset of measurement data, $S_j^{DOE}$, is generated by metrology simulation. In these examples, a metrology simulation tool simulates the training dataset of measurement data, $S_j^{DOE}$, generated by the metrology tool in response to the measurement of a structure having a known, programmed shape characterized by the DOE of conditioning and non-conditioning parameters, $\{CP^{DOE}, NCP^{DOE}\}_i$. In some embodiments, the simulated metrology tool is the same metrology tool employed to ultimately measure structures having unknown values of one or more parameters of interest.

In some embodiments, the DOE set of conditioning and non-conditioning parameters, $\{CP^{DOE}, NCP^{DPOE}\}_i$ are generated by process simulation. In these embodiments, a process simulator is employed to generate a dataset of geometric models having known conditioning and non-conditioning parameters, $\{CP^{DOE}, NCP^{DOE}\}_i$, based on a DOE of known, programmed process parameters ($PP_i$). In turn, a metrology simulator is employed to generate the training dataset of measurement data, $S_j^{DOE}$, corresponding to the known, values of the conditioning and non-conditioning parameters, $\{CP^{DOE}, NCP^{DOE}\}_i$.

In another aspect, a parameter conditioned measurement model is trained based on the training dataset of measurement data, $S_j^{DOE}$, corresponding to the known values of the conditioning and non-conditioning parameters, $\{CP^{DOE}, NCP^{DOE}\}_i$.

Figure 2:
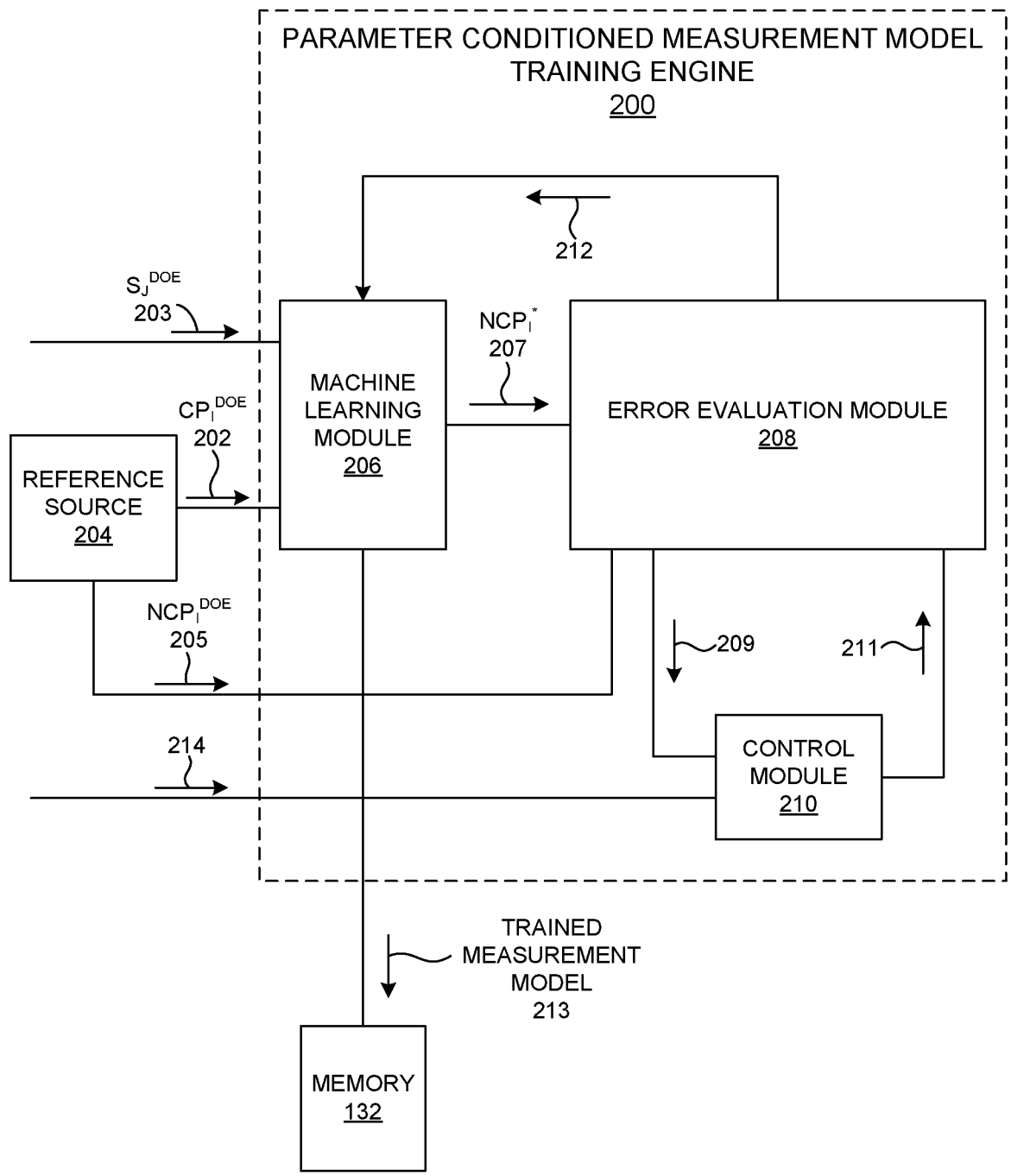
FIG. 2 is a diagram illustrative of an exemplary parameter conditioned measurement model training engine 200 in one embodiment.

FIG. 2 is a diagram illustrative of a parameter conditioned measurement model training engine 200 in one embodiment. In some embodiments, computing system 130 is configured as a parameter conditioned measurement model training engine 200 as described herein. As depicted in FIG. 2, parameter conditioned measurement model training engine 200 includes a machine learning module 206, an error evaluation module 208, and a control module 210. A training dataset of measurement data, $S_j^{DOE}$ 203, is provided as an input to machine learning module 206, along with the known values of the conditioning parameters, $CP_i^{DOE}$ 202.

In some examples, the parameter conditioned measurement model is a neural network model. As depicted in FIG. 2, machine learning module 206 evaluates a neural network model for data sets $S_j^{DOE}$ 203 and each of the known values of the conditioning parameters, $CP_i^{DOE}$ 202. The output of the neural network model is an estimated value of each of the non-conditioning parameters corresponding to the conditioning parameters, $NCP_i^*$ 207, communicated to error evaluation module 208. Error evaluation module 208 compares the estimated value of each non-conditioning parameter, $NCP_i^*$ 207, determined by the neural network model with the known value, $NCP_i^{DOE}$ 205, of the non-conditioning parameter. Error evaluation module 208 updates the neural network weighting values 212 to minimize a function characterizing a difference between determined and known values of the non-conditioning parameters (e.g., quadratic error function, linear error function, or any other suitable difference function). The updated neural network weighting values 212 are communicated to machine learning module 206. Machine learning module 206 updates the neural network model with the updated neural network weighting values for the next iteration of the training process. The iteration continues until the function characterizing a difference between determined and known values of the non-conditioning parameters is minimized. The resulting trained parameter conditioned measurement model 213 is communicated to memory (e.g., memory 132). The trained parameter conditioned measurement model 213 predicts the values of non-conditioning parameters for the provided measurement signals (e.g., spectra) and values of corresponding conditioning parameters.

As depicted in FIG. 2, parameter conditioned measurement model training engine 200 receives both conditioning and non-conditioning DOE parameter values, $CP_i^{DOE}$ 202 and $NCP_i^{DOE}$ 205, from a reference source 204. Reference source 204 is a trusted metrology system, a simulator, or any combination employed to generate a DOE set of conditioning and non-conditioning DOE parameter values, $CP_i^{DOE}$ 202 and $NCP_i^{DOE}$ 205, as described hereinbefore.

In a further aspect, a parameter conditioned measurement model is trained by dynamically controlling the weights associated with one or more measurement performance metrics employed to regularize the optimization driving the measurement model training process. By way of non-limiting example, critical performance metrics include R-squared ($R^2$), Slope, Gage Repeatability and Reproducibility (GRR), etc. At each training iteration, measurement model training engine 200 checks model performance with respect to each performance metric. This information is provided as input to a dynamic controller that adjusts the weights of each different performance objective at each iteration.

Measurement model training engine 200 trains a measurement model based on an optimization function regularized by the one or more measurement performance metrics, while dynamically controlling the weights associated with each regularization term of the optimization function. In some examples, the measurement model is a neural network model. As depicted in FIG. 2, machine learning module 206 evaluates a neural network model, h(•) for data sets $S_j^{DOE}$ 203 and conditioning parameter values, $CP_i^{DOE}$ 202.

At each iteration of the training process, control module 210 determines an updated value of each regularization weighting term, $\gamma_k$, associated with each measurement objective. Each updated value is determined based on the achieved value of the measurement objective and a desired value of each measurement objective. As depicted in FIG. 2, control module 210 receives an indication 209 of the value of each achieved measurement objective and the desired value of each measurement objective 214. At each iteration, control module 210 compares the achieved and desired values associated with each measurement objective and determines an updated value of each regularization weighting term 211. The updated value of each regularization weighting term 211 is communicated to loss evaluation module 208. Loss evaluation module 208 evaluates the optimization function using the updated values 211 at the next iteration.

By continuously adjusting the weights of each measurement objective during the training process, the neural network is trained to achieve the desired specifications of each of the measurement objectives with less computational effort.

Control module 210 employs a controller that optimizes for multiple measurement objectives. By way of non-limiting example, the controller is any of a Linear Quadratic Regulator (LQR) based controller, a proportional-integral-derivative (PID) controller, an optimal controller, an adaptive controller, a model predictive controller, etc.

In some embodiments, parameters of the controller are optimized for robust performance by a search algorithm, such as a genetic algorithm, a simulated annealing algorithm, a gradient descent algorithm, etc.

In some examples, each measurement performance metric is represented as a separate distribution. In one example, the distribution of measurement precision is an inverse gamma distribution. Equation (1) illustrates a probability density function, p, for measurement precision dataset, x, where, $\Gamma(\bullet)$, denotes the gamma function, the constant, a, denotes a shape parameter, and the constant, b, denotes a scale parameter.

$$p(x; a, b) = \frac{b^a x^{-a-1}}{\Gamma(a)} \exp\left(-\frac{b}{x}\right) \quad (1)$$

In another example, the distribution of mean values of instances of a measured structure over a wafer is described by a normal distribution. Equation (2) illustrates a probability density function, m, for measurement wafer mean dataset, x, where, $\mu$, denotes a specific mean and, $\sigma$, denotes a specific variance associated with the distribution.

$$m(x; \mu, \sigma^2) = \frac{1}{\sqrt{2\pi\sigma^2}} \exp -\frac{(x-\mu)^2}{2\sigma^2} \quad (2)$$

In a further aspect, the statistical information characterizing actual measurement data collected from structures, e.g., the known distributions associated with important measurement performance metrics such as measurement precision, wafer mean, etc., are specifically employed to regularize the optimization that drives measurement model training.

At each iteration, the optimization function drives changes to the weighting values, W, and bias values, b, of the neural network model, $h_{w,b}(\bullet)$ that minimize the optimization function. When the optimization function reaches a sufficiently low value, the measurement model is considered trained, and the trained measurement model 213 is stored in memory (e.g., memory 132).

In some examples, multiple metrics characterizing measurement tracking performance stably and quickly converge to final values. In one example, the multiple metrics include the $R^2$ value, slope value, and precision value associated with the measurement of a critical dimension of a DOE structure. In addition, the weighting values associated with the term of the objective function associated with each of the multiple metrics quickly and stably converges to a small number as the desired value of the performance objective is achieved.

In another aspect, training data is augmented by interpolation to determine values of non-conditioning parameters associated with selected values of conditioning parameters that lie between discrete DOE points, e.g., the number of discrete points where the shape of the structure is specified in the DOE dataset by the known values of both the conditioning and non-conditioning parameters. By augmenting the training data set with additional sets of conditioning and non-conditioning values, the smoothness of the trained model is increased, and thus the prediction accuracy of the trained model.

In another aspect, values of one or more non-conditioning parameters of interest are estimated from actual measurement data collected from a semiconductor structure under measurement and input values of one or more conditioning parameters based on a trained parameter conditioned measurement model. Values of the one or more non-conditioning parameters of interest are determined by scanning through a range of input values of the one or more conditioning parameters, and determining a value of each of the one or more non-conditioning parameters corresponding to each input value associated with the one or more conditioning parameters. In this manner, the shape of the measured structure is defined by the determined sets of conditioning and non-conditioning parameter values. The trained parameter conditioned measurement model is employed to determine a value of each non-conditioning parameter corresponding to each input value of the one or more conditioning parameters based on the actual measurement data.

Figure 3:
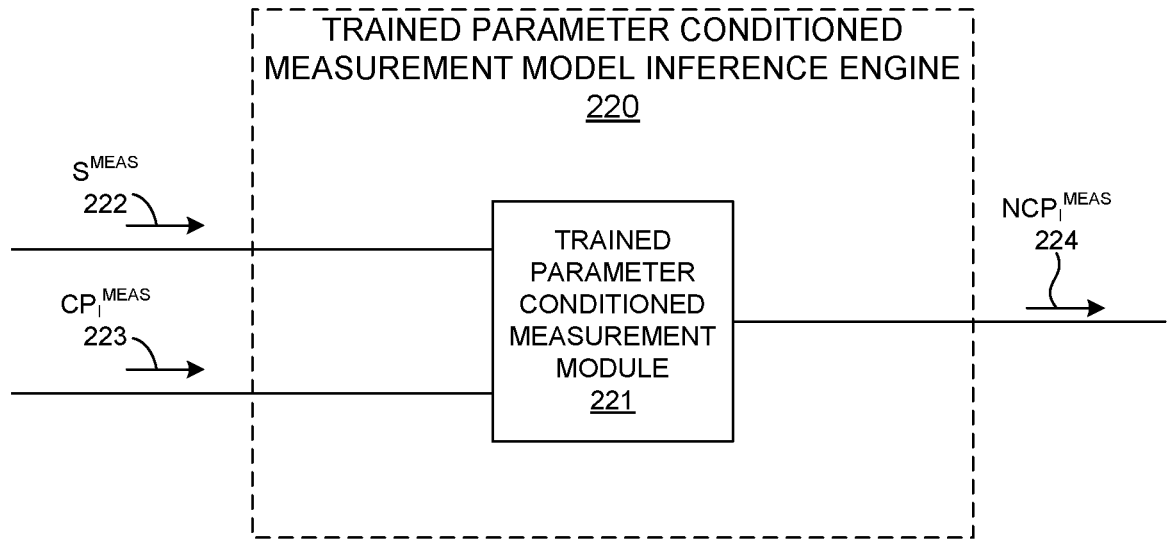
FIG. 3 is a diagram illustrative of a trained parameter conditioned measurement model inference engine 220 in one embodiment.

FIG. 3 is a diagram illustrative of a trained parameter conditioned measurement model inference engine 220 in one embodiment. As depicted in FIG. 3, trained parameter conditioned measurement model inference engine 220 includes a trained parameter conditioned measurement module 221. In the embodiment depicted in FIG. 3, measured data, $g^{MEAS}$ 222, collected by a metrology system or combination of metrology systems and a set of input values of one or more conditioning parameters, $CP_I^{MEAS}$ are provided as input to the trained parameter conditioned measurement module 221. The trained parameter conditioned measurement module 221 employs the trained parameter conditioned measurement model to determine values of non-conditioning parameters, $NCP_I^{MEAS}$ 224 corresponding to the input values of the of one or more conditioning parameters, $CP_I^{MEAS}$ 223. The pairings of conditioning and non-conditioning parameter values define the shape of the structure under measurement.

The trained parameter conditioned measurement model is employed to estimate values of one or more parameters of interest from actual measurement data (e.g., measured spectra) collected by the measurement system (e.g., metrology system 100). In some embodiments, the measurement system is the same measurement system employed to collect the DOE measurement data. In other embodiments, the measurement system is the system simulated to generate the DOE measurement data synthetically. In one example, the actual measurement data includes measured spectra 111 collected by metrology system 100 from one or more metrology targets having unknown values of the one or more parameters of interest.

In general, the trained parameter conditioned measurement model may be employed to estimate values of parameters of interest based on a single measured spectrum or estimate values of parameters of interest simultaneously based on multiple spectra.

In some embodiments, physical measurement performance metrics characterize the actual measurement data collected from each of the multiple instances of the one or more structures. In some embodiments the performance metrics are based on data collected from a reference metrology system, nominal DOE parameter values, historical data, domain knowledge about the processes involved in producing the structure, physics, statistical data collected from multiple processes and multiple metrology techniques, or best guess by a user. In some examples, a measurement performance metric is a single point estimate. In other examples, the measurement performance metric is a distribution of estimated values.

In general, the measurement performance metric associated with the measurement data collected from structures under measurement provides information about the values of the physical attributes of the structures. By way of non-limiting example, the physical attributes of the structures includes any of measurement precision, measurement accuracy, tool to tool matching, wafer mean, within wafer range, within wafer variations, wafer signature, tracking to reference, wafer to wafer variations, tracking to wafer split, etc.

In some examples, a measurement performance metric includes specific values of a non-conditioning parameter of a structure and corresponding uncertainties at specific locations on the wafer. In one example, the measurement performance metric is a critical dimension (CD) at a particular location on a wafer and its uncertainty, e.g., the CD is 35 nanometers +/−0.5 nanometers.

In some examples, a measurement performance metric includes a probability distribution of values of a parameter of a structure within a wafer, within a lot of wafers, or across multiple wafer lots. In one example, the CD has a normal distribution with a mean value and a standard deviation, e.g., mean value of CD is 55 nanometers and the standard deviation is 2 nanometers.

In some examples, a measurement performance metric includes a spatial distribution of values of a parameter of interest across a wafer, e.g., a wafer map, and the corresponding uncertainties at each location.

In some examples, a measurement performance metric includes distributions of measured values of parameters of interest across multiple tools to characterize tool to tool matching. The distributions may represent mean values across each wafer, values at each site, or both.

In some examples, a measurement performance metric includes a distribution of measurement precision errors.

In some examples, a measurement performance metric includes a wafer map matching estimates across wafer lots.

In some examples, a measurement performance metric includes one or metrics characterizing the tracking of estimated values of a parameter of interest with reference values of the parameter of interest. In some examples, the metrics characterizing tracking performance include any of an $R^2$ value, a slope value, and an offset value.

In some examples, a measurement performance metric includes one or more metrics characterizing the tracking of estimated values of a parameter of interest to wafer mean for a DOE split experiment. In some examples, the metrics characterizing tracking performance include any of an $R^2$ value, a slope value, and an offset value.

Figure 4:
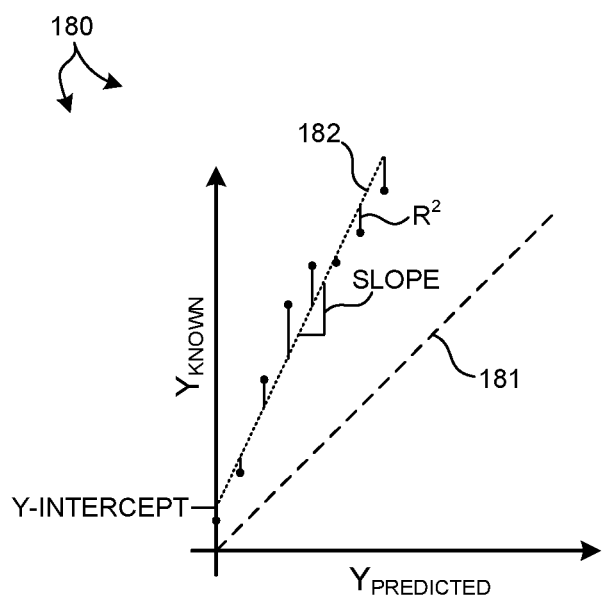
FIG. 4 is a plot illustrative of metrics characterizing measurement tracking performance.

FIG. 4 illustrates a plot 180 indicative of metrics characterizing tracking performance. As illustrated in FIG. 4, the x-location of each data point on plot 180 indicates the predicted value of a non-conditioning parameter of interest and the y-location of each data point indicates the known value (e.g., DOE reference value) of the non-conditioning parameter of interest. Ideal tracking performance is indicated by dashed line 181. If all predicted values perfectly matched the corresponding known, trusted values, all data points would lie on line 181. However, in practice, tracking performance is not perfect. Line 182 illustrates a best fit line to the data points. As depicted in FIG. 4, line 182 is characterized by slope and a y-intercept values, and the correlation between the known and predicted values is characterized by the $R^2$ value.

In a further aspect, trained parameter conditioned measurement model performance is validated with test data using error budget analysis. Real measurement data, simulated measurement data, or both, may be employed as test data for validation purposes.

Error budget analysis over real data allows the estimation of the individual contribution of accuracy, tracking, precision, tool matching errors, wafer to wafer consistency, wafer signature consistency, etc. to total error. In some embodiments, test data is designed such that total model error is split into each contributing component.

By way of non-limiting example, real data includes any of the following subsets: real data with reference values for accuracy and tracking calculations. Reference values include slope, offset, $R^2$, 3STEYX, mean squared error, 3 sigma error, etc.; real data from measurements of the same site measured multiple times to estimate measurement precision; real data from measurements of the same site measured by different tools to estimate tool-to-tool matching; real data from measurement of sites on multiple wafers to estimate wafer to wafer changes of wafer mean and wafer variance; and real data measurements of multiple wafers to identify wafer signatures, e.g., typical wafer patterns like a bullseye pattern that is expected to be present for given wafers.

In some other examples, a parametrized model of the structure is employed to generate simulated data for error budget analysis. Simulated data is generated such that each parameter of the structure is sampled within its DOE while other parameters are fixed at nominal values. In some examples, other parameters of the simulation, e.g., system model parameters, are included in an error budget analysis. The true reference values of a parameter are known with simulated data, so errors due to changes of each parameter of the structure can be separated.

In some examples, additional simulated data is generated with different noise sampling to calculate precision error.

In some examples, additional simulated data is generated outside of the DOE of the parametrized structure to estimate extrapolation errors.

In some measurement applications it is important to determine a two-dimensional shape of a structure under measurement (e.g., memory measurement applications). In some of these measurement applications, two parameters are employed to describe the shape of the structure under measurement. One of the parameters is treated as the conditioning parameter provided as input to a trained parameter conditioned measurement model and the other parameter is treated as the non-conditioning parameter determined by the trained parameter conditioned measurement model.

Figure 5:
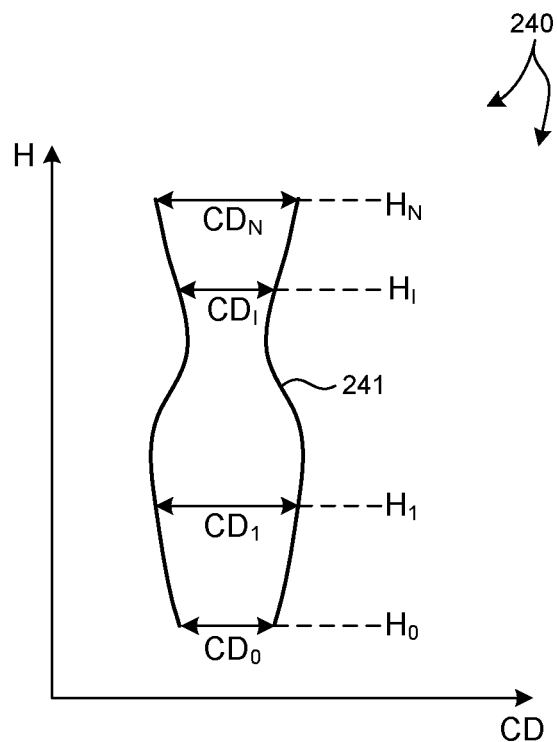
FIG. 5 is a diagram illustrative of a hole structure parameterized by two geometric parameters, height (H) and critical dimension (CD).

FIG. 5 depicts an illustration of a hole structure 240 parameterized by two geometric parameters. As depicted in FIG. 5, the shape 241 of hole structure 240 is described by a critical dimension parameter (CD) and a height parameter (H). In this example, the H parameter is treated as the conditioning parameter and the CD parameter is treated as the non-conditioning parameter. Hence, for each value of H, there is a corresponding value of CD.

Figure 6:
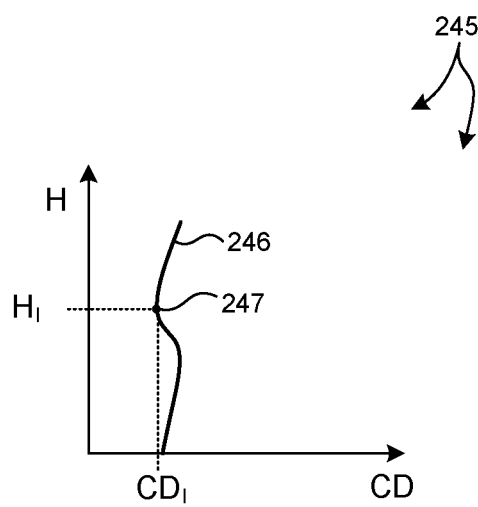
FIG. 6 is a diagram illustrative of a locus of input values of a conditioning parameter, H, and corresponding values of a non-conditioning parameter, CD.
Figure 7A:
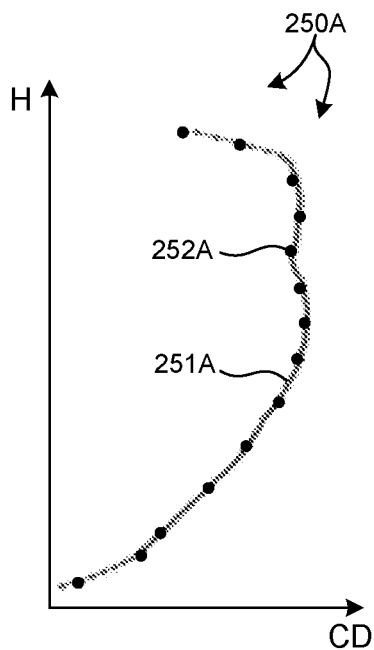
FIGS. 7A-J are plots illustrative of reference measurement values depicted as dots and a locus of CD values determined by a parameter conditioned measurement model; each plot associated with measurements of different instances of a hole structure.
Figure 7B:
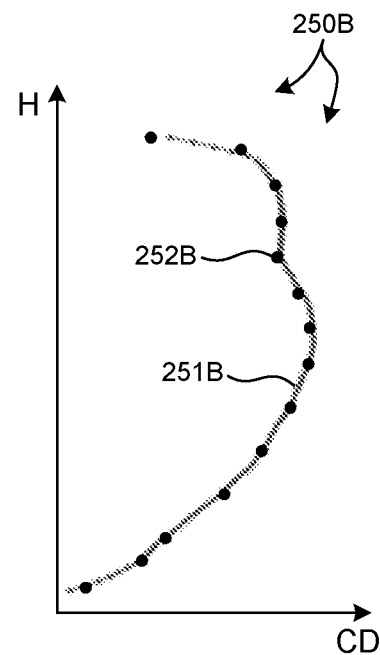
Figure 7C:
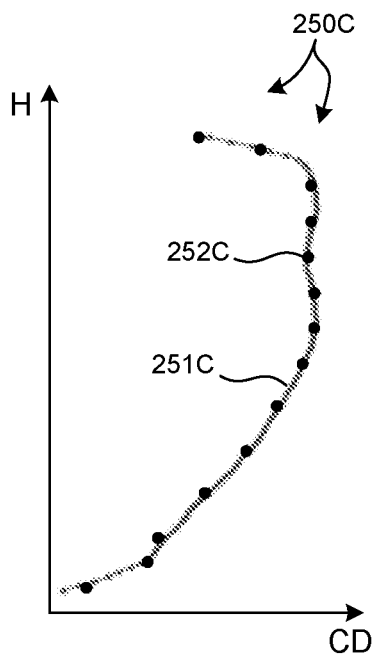
Figure 7D:
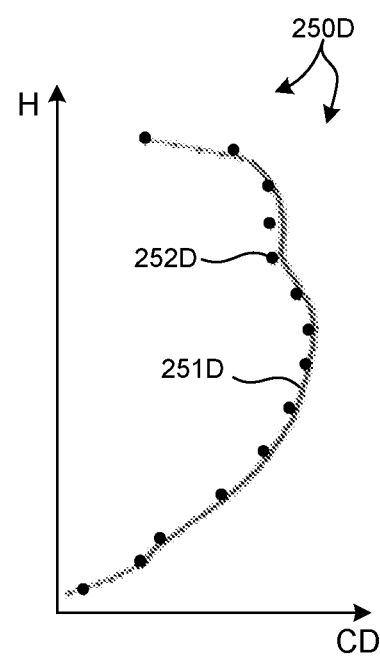
Figure 7E:
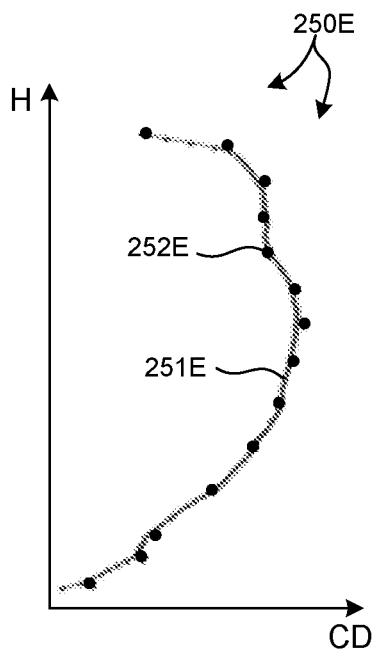
Figure 7F:
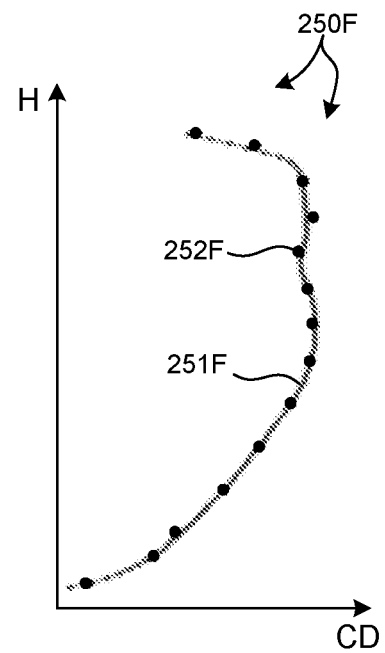
Figure 7G:
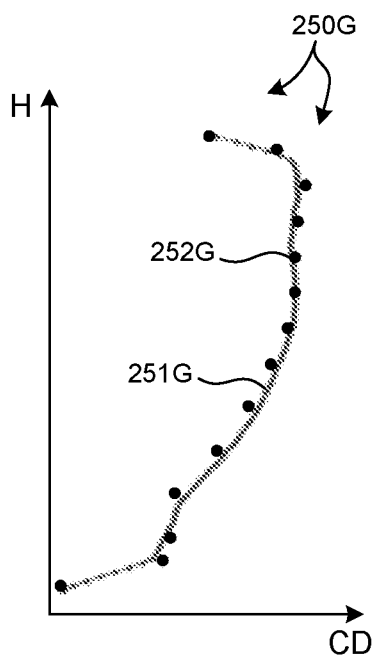
Figure 7H:
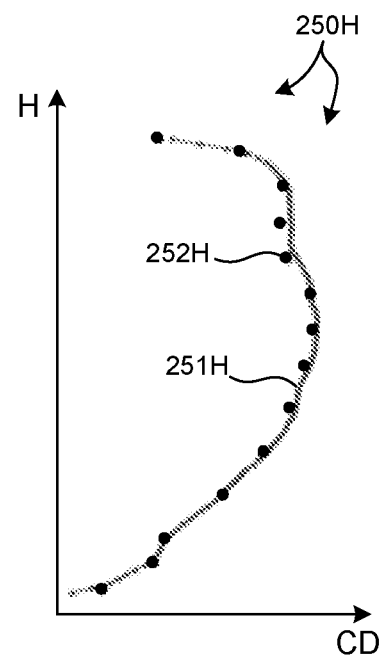
Figure 7J:
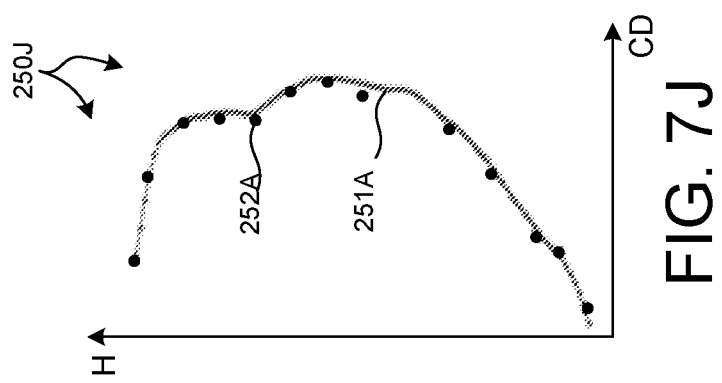
Figure 7I:
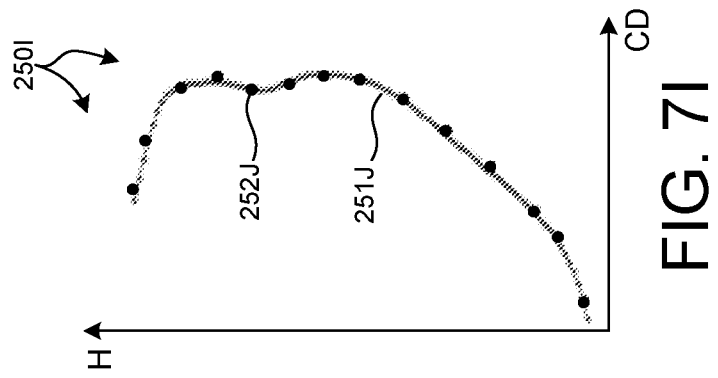

FIG. 6 depicts an illustration 245 of a locus 246 of corresponding values of H and CD. Point 247 on the locus 246 is associated with a specific combination of parameter values ($CD_I$, $H_I$). In this manner, locus 246 depicts an image of the shape 241 of the profile of hole structure 240.

Each of FIGS. 7A-J depict an illustration 250A-J, respectively, of a locus of corresponding values of H and CD associated with measurements of different instances of a hole structure.

FIGS. 7A-J depict a locus of points 251A-J, respectively, each point, e.g., points 252A-J, respectively, corresponding to a different combination of parameter values (CD, H). In this manner, lines 251A-J, respectively, depict an image of the shape of each of the measured hole structures.

In general, a trained parameter conditioned measurement model as described herein may be applied to estimate values of any parameter of interest employed to characterize the geometry of a measured structure (e.g., critical dimension, height, tilt, asymmetry, ellipticity, helix, etc.). In one example, height is treated as a conditioning parameter, and any of CD, tilt, asymmetry, ellipticity, helix, etc. is treated as a non-conditioning parameter.

In some measurement applications it is important to determine a three-dimensional shape of a structure under measurement. In some of these measurement applications, a voxel model is employed to characterize the structure under measurement.

Figure 8:
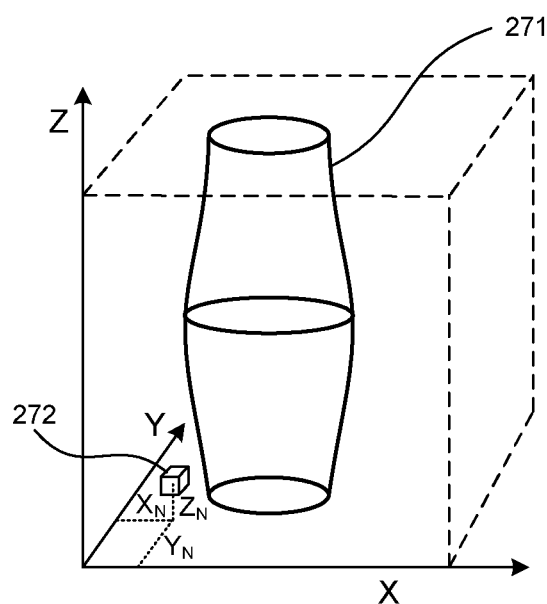
FIG. 8 depicts an illustration of a voxel model of a channel hole structure in one example.

FIG. 8 depicts an illustration of a voxel model of a channel hole structure 271. The geometric model of channel hole structure 271 is characterized by a grid array of voxels spanning a three dimensional volume enveloping the measured structure. The size and spacing of the voxels of the array is known apriori. As illustrated in FIG. 10, the $n^{th}$ voxel 272 is positioned at coordinates $\{X_n, Y_n, Z_n\}$ in three dimensional space and the size of the $n^{th}$ voxel is known. Each voxel is parameterized by a value of a property (e.g., transparency, electron density, etc.) of the voxel. In this manner the value associated with each of the voxels define a three dimensional image of the geometry of the channel hole structure 271 under measurement.

In one example, coordinates $\{X,Y,Z\}$ in three dimensional space are treated as conditioning parameters, and are provided as input to a trained parameter conditioned measurement model. The property of each voxel (e.g., transparency, electron density, etc.) is treated as a non-conditioning parameter. The trained parameter conditioned measurement model determines values of the non-conditioning parameter corresponding to each set of conditioning parameters, i.e., each voxel location, based on measurement data, $S^{MEAS}$, collected from a channel hole structure having unknown shape, e.g., measured spectra, measured diffraction images, etc.

In general, three dimensional images of a measured structure enable evaluation of tilt, asymmetry, ellipticity, helix, critical dimensions, sidewall angle, etc. from the same three dimensional image.

In some measurement applications it is important to determine a three-dimensional shape of a structure under measurement. In some of these measurement applications, a pixel model is employed to characterize the structure under measurement. In these embodiments, the geometric model of a structure is characterized by a two-dimensional grid array of pixels spanning a two dimensional area spanning two dimensions of the measured structure. The size and spacing of the pixels of the array is known apriori. Each pixel is parameterized by the magnitude of extent in the third spatial dimension. In this manner the value associated with each of the pixels defines a three dimensional image of the geometry of the structure under measurement. By one example, the conditioning parameters are the $\{X,Y\}$ location of the pixel, and thickness, T, is the magnitude of the direction of extent in the Z-direction corresponding to each pixel. The coordinate locations $\{X,Y\}$ in a two dimensional space are treated as conditioning parameters, and are provided as input to a trained parameter conditioned measurement model. The thickness, T, of each pixel is treated as a non-conditioning parameter. The trained parameter conditioned measurement model determines values of the non-conditioning parameter corresponding to each set of conditioning parameters, i.e., each pixel location, based on measurement data, $S^{MEAS}$, collected from a planar structure having unknown thickness, e.g., measured spectra, measured diffraction images, etc. In one example, measurements of nanosheet structures are performed with a trained parameter conditioned measurement model as described herein. In some examples, nanosheet location is represented by one or more conditioning parameters and one or more nanosheet features, e.g., thickness, is a non-conditioning parameter.

In general, any number of conditioning parameters may be employed as input to train and use a parameter conditioned measurement model. Similarly, any combination of measurement signals may be employed as input to train and use a parameter conditioned measurement model (e.g., signals from one or more optical metrology systems, one or more x-ray metrology systems, or a combination thereof).

In general, a trained parameter conditioned measurement model may be employed to estimate values of parameters of interest based on a single measured spectrum or estimate values of parameters of interest simultaneously based on multiple spectra.

In some examples, the measurement data associated with the measurement of each of multiple instances of one or more Design of Experiments (DOE) metrology targets by a metrology system is simulated. The simulated data is generated from a parameterized model of the measurement of each of the one or more DOE metrology structures by the metrology system.

In some other examples, the measurement data associated with multiple instances of one or more Design of Experiments (DOE) metrology targets is actual measurement data collected by a metrology system or multiple instances of a metrology system. In some embodiments, the same metrology system or multiple instances of the metrology system is employed to collect the actual measurement data from instances of metrology targets having unknown values of one or more parameters of interest. In some embodiments, a different instance of the metrology system or multiple, different instances of the metrology system is employed to collect the actual measurement data from instances of metrology targets having unknown values of one or more parameters of interest.

In some embodiments, values of parameters of interest employed to train a parameter conditioned measurement model are derived from measurements of DOE wafers by a reference metrology system. The reference metrology system is a trusted measurement system that generates sufficiently accurate measurement results. In some examples, reference metrology systems are too slow to be used to measure wafers on-line as part of the wafer fabrication process flow, but are suitable for off-line use for purposes such as model training. By way of non-limiting example, a reference metrology system may include a stand-alone optical metrology system, such as a spectroscopic ellipsometer (SE), SE with multiple angles of illumination, SE measuring Mueller matrix elements, a single-wavelength ellipsometer, a beam profile ellipsometer, a beam profile reflectometer, a broadband reflective spectrometer, a single-wavelength reflectometer, an angle-resolved reflectometer, an imaging system, a scatterometer, such as a speckle analyzer, an X-ray based metrology system such as a small angle x-ray scatterometer (SAXS) operated in a transmission or grazing incidence mode, an x-ray diffraction (XRD) system, an x-ray fluorescence (XRF) system, an x-ray photoelectron spectroscopy (XPS) system, an x-ray reflectometer (XRR) system, a Raman spectroscopy system, an atomic force microscopy (AFM) system, a transmission electron microscopy system, a scanning electron microscopy system, a soft X-ray reflectometry system, an imaging based metrology system, a hyperspectral imaging based metrology system, a scatterometry overlay metrology system, or other technologies capable of determining device geometry.

In some embodiments, a measurement model trained as described herein is implemented as a neural network model. In other examples, a measurement model may be implemented as a linear model, a non-linear model, a polynomial model, a response surface model, a support vector machines model, a decision tree model, a random forest model, a kernel regression model, a deep network model, a convolutional network model, or other types of models.

In yet another further aspect, the measurement results described herein can be used to provide active feedback to a process tool (e.g., lithography tool, etch tool, deposition tool, etc.). For example, values of measured parameters determined based on measurement methods described herein can be communicated to an etch tool to adjust the etch time to achieve a desired etch depth. In a similar way etch parameters (e.g., etch time, diffusivity, etc.) or deposition parameters (e.g., time, concentration, etc.) may be included in a measurement model to provide active feedback to etch tools or deposition tools, respectively. In some example, corrections to process parameters determined based on measured device parameter values determined using a trained parameter conditioned measurement model may be communicated to the process tool. In one embodiment, computing system 130 determines values of one or more parameters of interest during process based on measured signals 111 received from a measurement system. In addition, computing system 130 communicates control commands to a process controller (not shown) based on the determined values of the one or more parameters of interest. The control commands cause the process controller to change the state of a process (e.g., stop the etch process, change the diffusivity, change lithography focus, change lithography dosage, etc.).

In some embodiments, the methods and systems for metrology of semiconductor devices as described herein are applied to the measurement of memory structures. These embodiments enable optical critical dimension (CD), film, and composition metrology for periodic and planar structures.

In some examples, the measurement models are implemented as an element of a SpectraShape® optical critical-dimension metrology system available from KLA-Tencor Corporation, Milpitas, California, USA. In this manner, the model is created and ready for use immediately after the spectra are collected by the system.

In some other examples, the measurement models are implemented off-line, for example, by a computing system implementing AcuShape° software available from KLA-Tencor Corporation, Milpitas, California, USA. The resulting, trained model may be incorporated as an element of an AcuShape® library that is accessible by a metrology system performing measurements.

Figure 9:
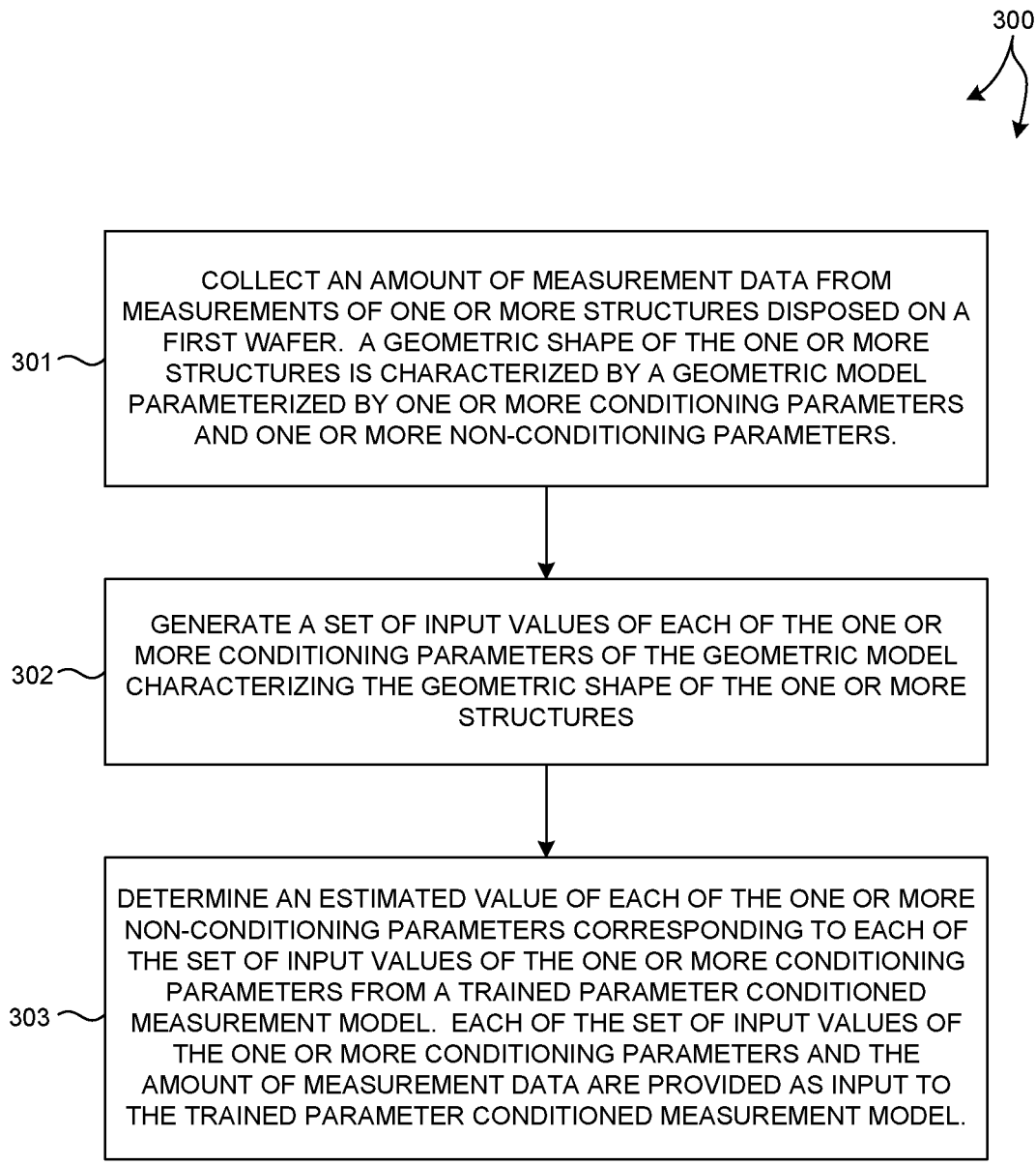
FIG. 9 illustrates a flowchart of a method 300 for training a parameter conditioned measurement model for estimating values of parameters of interest.

FIG. 9 illustrates a method 300 of training a parameter conditioned measurement model in at least one novel aspect. Method 300 is suitable for implementation by a metrology system such as metrology system 100 illustrated in FIG. 1 of the present invention. In one aspect, it is recognized that data processing blocks of method 300 may be carried out via a pre-programmed algorithm executed by one or more processors of computing system 130, or any other general purpose computing system. It is recognized herein that the particular structural aspects of metrology system 100 do not represent limitations and should be interpreted as illustrative only.

In block 301, an amount of measurement data is collected from measurements of one or more structures disposed on a first wafer. A geometric shape of the one or more structures is characterized by a geometric model parameterized by one or more conditioning parameters and one or more non-conditioning parameters.

In block 302, a set of input values is generated for each of the one or more conditioning parameters of the geometric model characterizing the geometric shape of the one or more structures.

In block 303, an estimated value of each of the one or more non-conditioning parameters corresponding to each of the set of input values of the one or more conditioning parameters is determined from a trained parameter conditioned measurement model. Each of the set of input values of the one or more conditioning parameters and the amount of measurement data are provided as input to the trained parameter conditioned measurement model.

In a further embodiment, system 100 includes one or more computing systems 130 employed to perform measurements of semiconductor structures based on a trained parameter conditioned measurement model in accordance with the methods described herein. The one or more computing systems 130 may be communicatively coupled to one or more spectrometers, active optical elements, process controllers, etc. In one aspect, the one or more computing systems 130 are configured to receive measurement data associated with spectral measurements of structures of wafer 101.

It should be recognized that one or more steps described throughout the present disclosure may be carried out by a single computer system 130 or, alternatively, a multiple computer system 130. Moreover, different subsystems of system 100 may include a computer system suitable for carrying out at least a portion of the steps described herein. Therefore, the aforementioned description should not be interpreted as a limitation on the present invention but merely an illustration.

In addition, the computer system 130 may be communicatively coupled to the spectrometers in any manner known in the art. For example, the one or more computing systems 130 may be coupled to computing systems associated with the spectrometers. In another example, the spectrometers may be controlled directly by a single computer system coupled to computer system 130.

The computer system 130 of system 100 may be configured to receive and/or acquire data or information from the subsystems of the system (e.g., spectrometers and the like) by a transmission medium that may include wireline and/or wireless portions. In this manner, the transmission medium may serve as a data link between the computer system 130 and other subsystems of system 100.

Computer system 130 of system 100 may be configured to receive and/or acquire data or information (e.g., measurement results, modeling inputs, modeling results, reference measurement results, etc.) from other systems by a transmission medium that may include wireline and/or wireless portions. In this manner, the transmission medium may serve as a data link between the computer system 130 and other systems (e.g., memory on-board system 100, external memory, or other external systems). For example, the computing system 130 may be configured to receive measurement data from a storage medium (i.e., memory 132 or an external memory) via a data link. For instance, spectral results obtained using the spectrometers described herein may be stored in a permanent or semi-permanent memory device (e.g., memory 132 or an external memory). In this regard, the spectral results may be imported from on-board memory or from an external memory system. Moreover, the computer system 130 may send data to other systems via a transmission medium. For instance, a measurement model or an estimated parameter value determined by computer system 130 may be communicated and stored in an external memory. In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions 134 stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including measurement applications such as critical dimension metrology, overlay metrology, focus/dosage metrology, and composition metrology. However, such terms of art do not limit the scope of the term "metrology system" as described herein. In addition, the system 100 may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the techniques described herein.

Various embodiments are described herein for a semiconductor measurement system that may be used for measuring a specimen within any semiconductor processing tool (e.g., an inspection system or a lithography system). The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide.

Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A system comprising:
   one or more metrology systems including an illumination source configured to direct an amount of illumination electromagnetic radiation onto one or more structures disposed on a first wafer and a detector configured to detect an amount of electromagnetic radiation from the one or more structures in response to the amount of incident illumination electromagnetic radiation as an amount of measurement data, a geometric shape of the one or more structures characterized by a geometric model parameterized by one or more conditioning parameters and one or more non-conditioning parameters; and
   a computing system configured to:
     receive the amount of measurement data from the measurements of the one or more structures disposed on the first wafer;
     generate a set of input values of each of the one or more conditioning parameters of the geometric model characterizing the geometric shape of the one or more structures; and
     determine an estimated value of each of the one or more non-conditioning parameters corresponding to each of the set of input values of the one or more conditioning parameters from a trained parameter conditioned measurement model, wherein each of the set of input values of the one or more conditioning parameters and the amount of measurement data are provided as input to the trained parameter conditioned measurement model.

2. The system of claim 1, the computing system further configured to:
   receive an amount of Design of Experiments (DOE) measurement data associated with measurements of one or more DOE structures;
   receive known, reference values of one or more conditioning parameters and one or more non-conditioning parameters corresponding to the one or more conditioning parameters at a plurality of discrete locations of the one or more DOE structures, the one or more conditioning parameters and the one or more non-conditioning parameters characterizing a geometric shape of the one or more DOE structures; and
   iteratively train the parameter conditioned measurement model based on the amount of DOE measurement data and the known, reference values of the one or more conditioning parameters and the one or more non-conditioning parameters, wherein the training involves a minimization of an optimization function including one or more measurement performance metrics.

3. The system of claim 2, wherein the optimization function includes a regularization term associated with each of the one or more measurement performance metrics, and wherein a weighting value associated with each of the regularization terms is dynamically controlled during iteration of the parameter conditioned measurement model.

4. The system of claim 2, wherein at least a portion of the amount of DOE measurement data associated with measurements of one or more DOE structures is generated by a simulation.

5. The system of claim 4, wherein the reference values of one or more parameters of interest associated with the one or more DOE structures are programmed values associated with the simulation.

6. The system of claim 2, wherein the known, reference values of the one or more conditioning parameters and the one or more non-conditioning parameters associated with the one or more DOE metrology targets are measured by a trusted, reference metrology system.

7. The system of claim 2, wherein at least a portion of the amount of DOE measurement data is collected from actual measurements of the one or more DOE structures disposed on a second wafer.

8. The system of claim 7, wherein the first wafer and the second wafer are the same wafer.

9. The system of claim 2, the computing system further configured to:
determine additional reference values of one or more conditioning parameters and one or more non-conditioning parameters corresponding to the one or more conditioning parameters at one or more locations between the plurality of discrete locations of the one or more DOE structures by interpolation.

10. The system of claim 1, wherein the trained parameter conditioned measurement model is a machine learning based model.

11. The system of claim 1, wherein the geometric shape of the one or more structures characterized by the geometric model parameterized by one or more conditioning parameters and one or more non-conditioning parameters is two dimensional or three dimensional.

12. The system of claim 1, wherein the amount of measurement data includes measurements of the one or more structures by at least one optical based metrology system, at least one x-ray based metrology system, or any combination thereof.

13. The system of claim 1, wherein the one or more conditioning parameters is a height parameter, and wherein the one or more non-conditioning parameters includes any of a critical dimension, a tilt, an ellipticity, and a helix.

14. A method comprising:
illuminating one or more structures disposed on a first wafer with an amount of illumination electromagnetic radiation;
detecting an amount of electromagnetic radiation from the one or more structures in response to the amount of incident illumination electromagnetic radiation as an amount of measurement data, a geometric shape of the one or more structures characterized by a geometric model parameterized by one or more conditioning parameters and one or more non-conditioning parameters;
generating a set of input values of each of the one or more conditioning parameters of the geometric model characterizing the geometric shape of the one or more structures; and
determining an estimated value of each of the one or more non-conditioning parameters corresponding to each of the set of input values of the one or more conditioning parameters from a trained parameter conditioned measurement model, wherein each of the set of input values of the one or more conditioning parameters and the amount of measurement data are provided as input to the trained parameter conditioned measurement model.

15. The method of claim 14, further comprising:
receiving an amount of Design of Experiments (DOE) measurement data associated with measurements of one or more DOE structures;
receiving known, reference values of one or more non-conditioning parameters and one or more non-conditioning parameters corresponding to the one or more conditioning parameters at a plurality of discrete locations of the one or more DOE structures, the one or more conditioning parameters and the one or more non-conditioning parameters characterizing a geometric shape of the one or more DOE structures; and
iteratively training the parameter conditioned measurement model based on the amount of DOE measurement data and the known, reference values of the one or more conditioning parameters and the one or more non-conditioning parameters, wherein the training involves a minimization of an optimization function including one or more measurement performance metrics.

16. The method of claim 15, further comprising:
dynamically controlling a weighting value associated with each regularization term during iteration of the parameter conditioned measurement model, wherein the optimization function includes a regularization term associated with each of the one or more measurement performance metrics.

17. The method of claim 15, further comprising:
determining additional reference values of one or more conditioning parameters and one or more non-conditioning parameters corresponding to the one or more conditioning parameters at one or more locations between the plurality of discrete locations of the one or more DOE structures by interpolation.

18. The method of claim 14, wherein the amount of measurement data includes measurements of the one or more structures by at least one optical based metrology system, at least one x-ray based metrology system, or any combination thereof.

19. A system comprising:
one or more metrology systems including an illumination source configured to direct an amount of illumination electromagnetic radiation onto one or more structures disposed on a first wafer and a detector configured to detect an amount of electromagnetic radiation from the one or more structures in response to the amount of incident illumination electromagnetic radiation as an amount of measurement data, a geometric shape of the one or more structures characterized by a geometric model parameterized by one or more conditioning parameters and one or more non-conditioning parameters; and
a non-transitory, computer-readable medium including instructions that when executed by one or more processors of a computing system cause the computing system to:
receive the amount of measurement data from the measurements of the one or more structures disposed on the first wafer;
generate a set of input values of each of the one or more conditioning parameters of the geometric model characterizing the geometric shape of the one or more structures; and
determine an estimated value of each of the one or more non-conditioning parameters corresponding to each of the set of input values of the one or more conditioning parameters from a trained parameter conditioned measurement model, wherein each of the set of input values of the one or more conditioning parameters and the amount of measurement data are provided as input to the trained parameter conditioned measurement model.

20. The system of claim 19, the non-transitory, computer-readable medium further including instructions that when executed by one or more processors of the computing system cause the computing system to:

receive an amount of Design of Experiments (DOE) measurement data associated with measurements of one or more DOE structures;

receive known, reference values of one or more conditioning parameters and one or more non-conditioning parameters corresponding to the one or more conditioning parameters at a plurality of discrete locations of the one or more DOE structures, the one or more conditioning parameters and the one or more non-conditioning parameters characterizing a geometric shape of the one or more DOE structures; and iteratively train the parameter conditioned measurement model based on the amount of DOE measurement data and the known, reference values of the one or more conditioning parameters and the one or more non-conditioning parameters, wherein the training involves a minimization of an optimization function including one or more measurement performance metrics.

* * * * *